United States Patent [19]
Brown

[11] Patent Number: 5,289,725
[45] Date of Patent: Mar. 1, 1994

[54] MONOLITHIC FLOW TUBE WITH IMPROVED DIELECTRIC PROPERTIES FOR USE WITH A MAGNETIC FLOWMETER

[75] Inventor: Christopher R. Brown, Wrentham, Mass.

[73] Assignee: The Foxboro Company, Foxborough, Mass.

[21] Appl. No.: 738,595

[22] Filed: Jul. 31, 1991

[51] Int. Cl.⁵ .................................................. G01F 1/58
[52] U.S. Cl. ................................. 73/861.12; 29/607.1
[58] Field of Search ........... 73/861.12, 861.13, 861.14, 73/861.15, 861.16, 861.17, 861.11; 29/602.1, 25.41, 25.42

[56] References Cited

U.S. PATENT DOCUMENTS

| | | | |
|---|---|---|---|
| 2,929,247 | 3/1960 | Sturgeon | 73/862.12 |
| 3,194,068 | 7/1965 | Mannherz et al. | 73/861.12 |
| 3,286,522 | 11/1966 | Cushing | 73/861.12 |
| 3,610,040 | 10/1971 | Wada | 73/861.12 |
| 3,750,468 | 8/1973 | Grauer | 73/861.12 |
| 4,128,776 | 12/1978 | Boquist et al. | 310/11 |
| 4,181,013 | 1/1980 | Wada | 73/861.12 |
| 4,214,477 | 7/1980 | Schmoock | 73/861.12 |
| 4,253,340 | 3/1981 | Schmoock | 73/861.12 |
| 4,262,542 | 4/1981 | Freund, Jr. et al. | 73/861.12 |
| 4,269,071 | 5/1981 | Wada | 73/861.12 |
| 4,279,166 | 7/1981 | Gryn et al. | 73/861.12 |
| 4,281,552 | 8/1981 | Nissen et al. | 73/861.12 |
| 4,290,312 | 9/1981 | Kobayashi | 73/861.12 |
| 4,297,895 | 11/1981 | Gryn | 73/861.12 |
| 4,388,834 | 6/1983 | Schmoock | 73/861.12 |
| 4,409,846 | 10/1983 | Ueno | 73/861.17 |
| 4,428,241 | 1/1984 | Davis et al. | 73/861.12 |
| 4,454,766 | 6/1984 | Reinhold et al. | 73/861.12 |
| 4,459,857 | 7/1984 | Murray et al. | 73/861.12 |
| 4,499,754 | 2/1985 | Akano et al. | 73/861.12 |
| 4,507,975 | 4/1985 | Bittner et al. | 73/861.12 |
| 4,513,624 | 4/1985 | McHale et al. | 73/861.12 |
| 4,517,846 | 5/1985 | Harrison et al. | 73/861.12 |
| 4,539,853 | 9/1985 | Appel et al. | 73/861.12 |
| 4,565,619 | 1/1986 | Gardner et al. | 204/400 |
| 4,567,775 | 2/1986 | Schmoock | 73/861.12 |
| 4,604,905 | 8/1986 | Rademacher-Dubbick | 73/861.12 |
| 4,631,969 | 12/1986 | Schmoock | 73/861.12 |
| 4,658,652 | 4/1987 | Picone et al. | 73/861.12 |
| 4,679,442 | 7/1987 | Kubota | 73/861.12 |
| 4,716,649 | 1/1988 | Bittner et al. | 29/602.1 |
| 4,741,215 | 5/1988 | Bohn et al. | 73/861.12 |
| 4,782,709 | 11/1988 | Goto et al. | 29/602.1 |
| 4,912,838 | 4/1990 | Goto et al. | 29/602.1 |
| 4,932,268 | 6/1990 | Hafner | 73/861.12 |

FOREIGN PATENT DOCUMENTS

| | | |
|---|---|---|
| 0163396 | 12/1985 | European Pat. Off. |
| 2950039 | 2/1981 | Fed. Rep. of Germany |
| 2368018 | 5/1978 | France |
| 58-196419 | 5/1982 | Japan |
| 59-222719 | 12/1984 | Japan |
| 62-042013 | 2/1987 | Japan |
| 2-054122 | 2/1990 | Japan |
| WO87/01197 | 2/1987 | PCT Int'l Appl. |
| WO90/07694 | 7/1990 | PCT Int'l Appl. |
| WO91/05225 | 4/1991 | PCT Int'l Appl. |
| WO83/02000 | 5/1982 | World Int. Prop. O. |

OTHER PUBLICATIONS

Database WPI, Section EI, Week 7936, Oct. 17, 1979, Derwent Publications Ltd., London GB; Class R13, AN 79-H6878B & SU,A,635 396 (Tall Measuring) 30 Nov. 1978.

Primary Examiner—Donald O. Woodiel
Attorney, Agent, or Firm—Wolf, Greenfield & Sacks

[57] ABSTRACT

A monolithic flowtube for use with an electromagnetic flowmeter includes an inner portion formed of an improved purity dielectric material having a reduced number of mobile ions, a pair of electrodes adjacent the exterior surface of the inner portion and capacitively coupled thereto, and an outer layer of ceramic material adjacent the exterior surface of the inner conduit and electrodes. A method of manufacturing the flowtube includes the steps of forming a dielectric material into a substantially tubular conduit, depositing a conductive material, preferably a refractory metal, onto the exterior of the tubular conduit, forming an outer layer of ceramic material over the tubular conduit, and firing all components simultaneously in a reducing atmosphere to form a monolithic flowtube body.

20 Claims, 6 Drawing Sheets

MONOLITHIC FLOW TUBE WITH IMPROVED DIELECTRIC PROPERTIES FOR USE WITH A MAGNETIC FLOWMETER

FIELD OF THE INVENTION

This invention relates generally to magnetic flowmeters for measuring the flow rate of a fluid, and, more particularly, to a monolithic flowtube having a pair of electrodes embedded therein and formed of a ceramic material having improved dielectric properties.

BACKGROUND OF THE INVENTION

Electromagnetic flowmeters for measuring the volumetric flow rates of fluids are used extensively in the process control industry. In a magnetic flowmeter, an magnetic field is generated having lines of flux which are perpendicular to the longitudinal axis of the flowtube through which the fluid to be metered is conducted. The flux lines are also perpendicular to the transverse axis along which a pair of measuring electrodes are located at diametrically-opposed positions with respect to the flowtube. An electromotive force induced in the fluid by the magnetic field and the moving fluid produces a voltage across the electrodes. That voltage is a function of the process flow rate.

In one type of magnetic flowmeter, the electrodes are electrically insulated from the fluid to be metered, by a dielectric material. Such an "non wetted" electrode configuration is advantageous in handling troublesome process fluids such as corrosive fluids, sewage and slurries which could damage and corrode the electrodes if in contact therewith.

In flowmeters having non wetted electrodes, the electrodes are either embedded in the flowtube or disposed on the exterior surface thereof. Either electrode configuration has problems associated therewith. For example, U.S. Pat. No. 4,658,652, Picone et al., discloses a flowmeter having a spool-shaped flowtube formed of a ceramic material and having a pair of electrodes disposed on the exterior surface thereof. The thickness of the ceramic material results in a weak signal at the electrodes, requiring greater amplification and processing of the signal. A reduction in the amount of material separating the electrodes from the process fluids increases the signal strength but decreases the structural integrity of the flowtube and its ability to withstand pressure exerted thereon by the process fluid.

Flowmeters in which the electrodes are embedded within the wall of the flowtube present unique manufacturing problems. For example, Japanese Laid-Open Patent Application No. 58-196419 discloses a method of manufacturing flowtubes characterized by forming an electrode, by a metalizing process, on the outer surface of a first tube of unfired ceramics, and fitting a second tube, also made of unfired ceramics, about the surface of the first tube. Both tubes are then fired together to form a whole unit. A disadvantage of this method is that voids or air pockets form intermediate the two tubes during the firing process. Such voids seriously jeopardize the integrity of the flowtube and its ability to withstand the pressure imparted thereto by the process. More importantly the voids may provide a path for process fluid to penetrate which renders the meter inoperable when the fluid reaches the electrodes.

International Patent Application WO87/01197 discloses a method for manufacturing a ceramic measurement tube in which powdered green ceramic material is placed in a mold with a pair of platinum wire grids located at specific positions. The unfired ceramic material is then compressed and fired. Such a method has several disadvantages. First, the precise placement of the platinum wire grids in a mold of raw ceramic material is very difficult. If the grids or electrodes are not diametrically opposed as precisely as possible, inaccurate flowtube measurements will result. Second, the use of a wire grid results in a relatively small electrode area and a correspondingly weaker signal. Third, platinum is a relatively expensive material and will substantially increase the production cost of the tube.

Accordingly, it is desirable to manufacture a flowtube for use with a magnetic flowmeter which is truly monolithic, with no seams exposed to the process fluid, and in which the electrodes are disposed in close proximity to, but not in contact with, the process fluid flowing therethrough.

A second problem associated with flowmeters having non wetted electrodes involves zero offsets present in the output signal of the flowmeter. Such offsets appear as voltages across the electrodes, despite the absence of any fluid flow through the flowmeter which, in an ideal flowmeter, should cause an output flow signal of zero volts. Zero offsets add an error component into the output flow signal from the flowmeter and often require external compensation circuitry to correct the output flow signal.

Accordingly, it is desirable to reduce the amount of zero offset in the output flow signal of a flowmeter.

It is, therefore, an object of the present invention to provide an electromagnetic flowmeter which can accurately measure the flow rate of a fluid passing therethrough.

Another object of the present invention is to provide an electromagnetic flowmeter which can accurately measure the flow rate of a fluid passing therethrough at temperatures up to 400° F.

A further object of the present invention is to provide a monolithic flowtube for use in an electromagnetic flowmeter for measuring fluid flow rates.

Yet another object of the present invention is to provide a monolithic flowtube for use with an electromagnetic flowmeter which has a pair of diametrically opposed capacitive electrodes embedded therein.

Still a further object of the present invention is to provide a monolithic flowtube for use with an electromagnetic flowmeter having a pair of electrodes embedded therein, the electrodes comprising a relatively inexpensive conductive material.

Yet a further object of the present invention to provide a flowtube for use with an electromagnetic flowmeter in which the component parts of the flowtube are sintered together to form a monolithic flowtube body.

BRIEF SUMMARY OF THE INVENTION

The above and other objects are achieved in accordance with the present invention which, according to a first aspect, provides a flowtube for use in an electromagnetic flowmeter comprising a tubular flow conduit having a dielectric portion through which fluid is adapted to flow, an electrode means capacitively coupled to the interior of the flow conduit through the dielectric portion, and means for electrically coupling the electrodes to the exterior of the flow conduit.

According to one embodiment of the present invention, the flowtube comprises a tubular inner conduit formed of dielectric material, electrodes means adjacent the exterior surface of the inner flow conduit and capacitively coupled to the inner flow conduit, and an outer layer of ceramic material adjacent the exterior surface of the inner flow conduit and the electrode means. The inner flow conduit, electrode means and outer ceramic layer are sintered together to form a monolithic flowtube body.

The dielectric material from which the inner flow conduit is formed is of an improved purity, having a reduced number of mobile ions at high temperatures. The electrodes means are applied as a viscous conductive paste mechanically deposited in a predetermined electrode pattern onto the exterior surface of the inner flow conduit at selective areas.

In another embodiment, the electrodes are formed of a refractory metal and the inner flow conduit, electrodes and outer ceramic layer sintered together in a reducing atmosphere to form a monolithic flowtube body. In still another embodiment, the inner flow conduit comprises a dielectric material having a dielectric loss tangent $\delta$ of less than 0.002 at 10 Hz between $-40°$ C. and $200°$ C. In yet another embodiment, the inner flow conduit comprises a dielectric material having a relaxation conductivity, $\sigma_r$, of less than $10^{-12}$ per ohm.cm at $200°$ C., 50 milliseconds after a polarizing voltage is applied or removed from the dielectric material A second, equally important aspect of the present invention provides a method of manufacturing a flowtube for use with an electromagnetic flowmeter comprising the steps of forming a dielectric material into a substantially tubular conduit, depositing a conductive material to the exterior of the tubular conduit at selective areas, forming an outer layer of ceramic material over the tubular conduit and conductive material, and firing the components simultaneously into a monolithic body. The method may also include the additional step of exposing parts of the selected areas of conductive material and coupling an electrical lead therewith.

The foregoing and other features, objects and advantages of the invention will be more fully understood by reading the detailed description below, in conjunction with the drawing.

DETAILED DESCRIPTION

Figure 1:
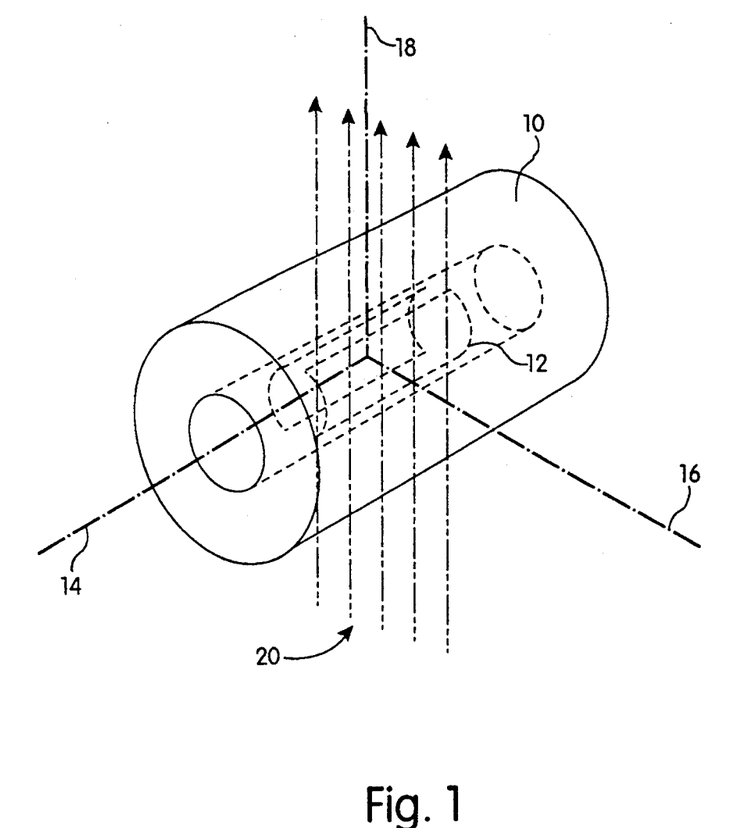
FIG. 1 is a perspective view of a flowtube illustrating the relationship of the magnetic field to the direction of fluid flow and the electrodes.

With reference now to the drawings, and more particularly to FIG. 1 thereof, a cylindrical flowtube 10 in accordance with the present invention is shown. Flowtube 10 has a longitudinal axis 14 which is also the axis along which fluid flows through flowtube 10. A pair of substantially arcuate electrodes 12 are disposed within the walls of flowtube 10 and are diametrically opposed to one another along the transverse axis 16, as shown in phantom. Electrodes 12 are buried within the walls of flowtube 10 and are not in contact with the process fluid, as explained hereinafter. A magnetic field, represented by flux lines 20, extends substantially parallel to axis 18 and is substantially mutually perpendicular to the longitudinal axis of flowtube 10 and the transverse axis along which the electrodes 12 are placed. The magnetic field is generated by an electromagnet and its associated circuitry (not shown).

In operation, each electrode 12 forms one plate of a pair of capacitors whose dielectric is the dielectric material of the flowtube and which share as their other plate the fluid being metered. The electrodes act as a capacitance-sensor to detect the voltage induced in the fluid when it intercepts the magnetic field whose flux lines 20 are normal to the flow direction.

The volumetric rate of fluid flow through flowtube 10 may be calculated using Faraday's Law of Induction. According to Faraday's Law, the voltage induced across any conductor as it moves at right angles through a magnetic field will be proportional to the velocity of that conductor. Accordingly, the voltage induced across electrodes 12 is proportional to the average velocity of the fluid and, hence, its average volumetric rate. Thus, coupling appropriate amplification and processing circuitry to electrodes 12, the flow rate of a fluid through flowtube 10 may be accurately determined.

Figure 2A:
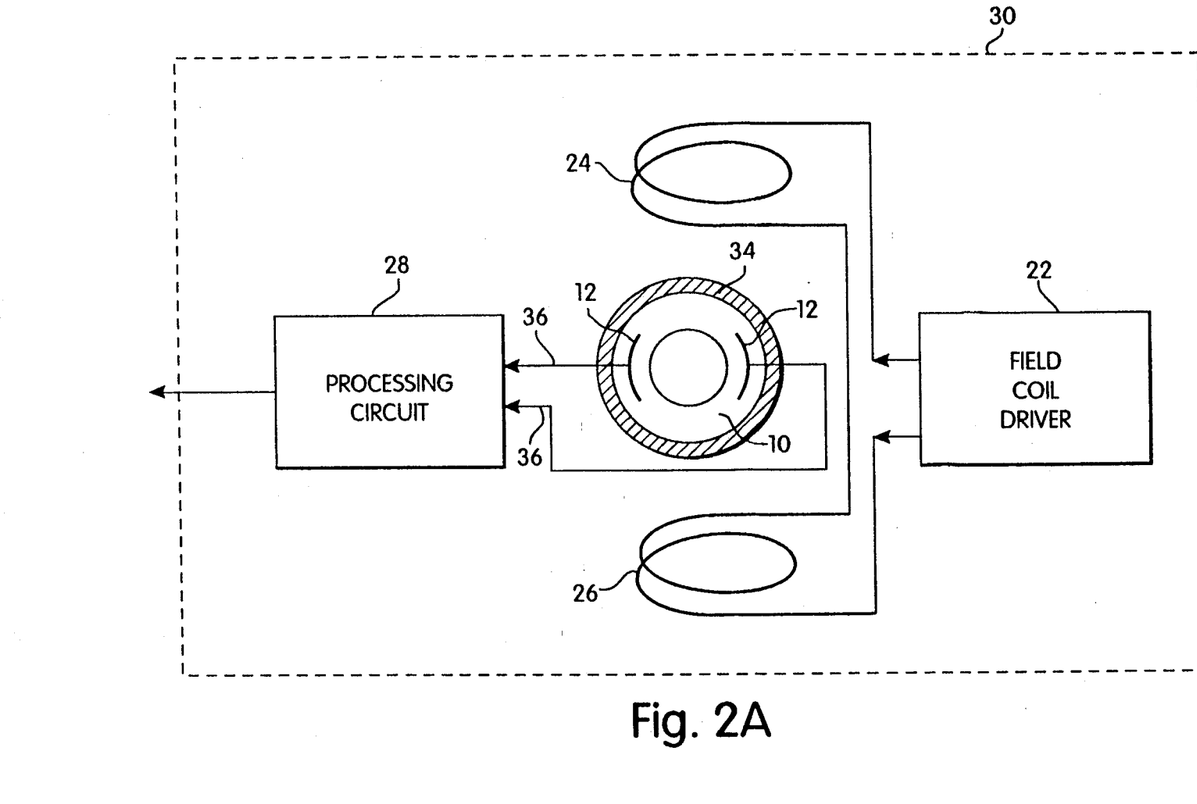
FIG. 2A is a block diagram of an electromagnetic flowmeter according to the present invention.

Referring to FIG. 2A, a block diagram of a magnetic flowmeter 30 in accordance with the present invention is illustrated. Flowmeter 30 comprises a flowtube 10 made of a preferably ceramic dielectric material having a pair of elongated, arcuate electrodes 12 embedded therein. Electrodes 12 are coupled to a processing circuit 28 by leads 36 which extend through flowtube 10. A part of leads 36 may be implemented with a twisted pair of coaxial cables. Flowtube 10 may have a metallic shield 34 surrounding its exterior surface, with apertures through which the leads 36 project.

Flowmeter 30 further comprises a field coil driver 22 which drives a pair of conventional field coils 24 and 26 which are wound around ferrous cores 27, 29 positioned on opposite sides of flowtube 10. Field coil driver 22 comprises conventional electronic circuitry for driving field coils 24 and 26, such circuitry being well-known in the art. In one embodiment, field coil driver 22 may include an oscillator coupled to a voltage-to-current converter, a current amplifier and other associated circuitry.

The flowmeter processing circuit 28 comprises electronic circuitry for detecting the flow signal from electrodes 12 and converting it into a usable output which may be supplied to a display unit or computer for central control of a processing system. The elements of processing circuit 28 are well-known in the art.

We have discovered a problem associated with non-wetted electrodes involving the dielectric relaxation characteristics of the material separating the electrodes from the process fluid. In particular, when the magnetic field changes, a voltage is induced across the dielectric material between the electrodes and the process fluids. This voltage polarizes the dielectric material and causes mobile ions to migrate as dictated by the impressed electric field. When the induced voltage is removed, the mobile ions reverse direction causing a detectable "relaxation" current which is manifest as a zero offset in the output flow signal of the flowmeter. In many dielectric materials, the amount of ion migration increases exponentially with temperature in the range of interest, i.e. $-40°$ C. to $200°$ C. As a result, the voltage offsets present in the output flow signal increase at higher temperature and render the flow signal unreliable without external circuitry to compensate for the increased zero offset. At the higher temperatures in the range of interest, the effect can be so great that compensation is impractical.

Figure 3:
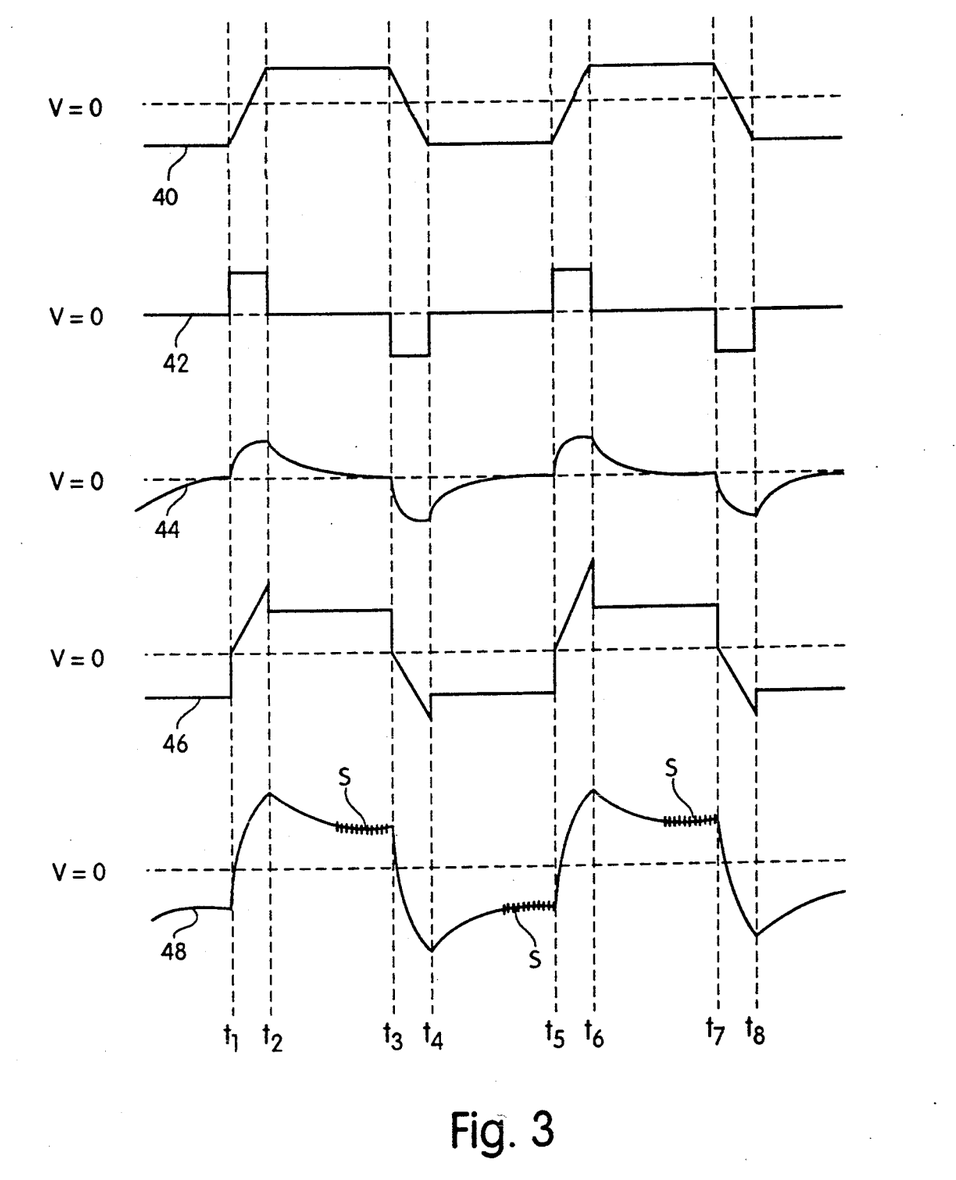
FIG. 3 is a timing diagram illustrating the various signals present in the circuit of FIG. 2A.

Referring to FIG. 3, a timing diagram illustrating the various signals present in flowmeter 30, is illustrated. As shown in FIG. 3, signal 40 is a clipped triangle wave typical of the coil current induced in field coils 24 and 26 by field coil driver 22. Signal 40 is a pulsed DC current of relatively low frequency, usually 2 to 20 Hz, with 5-10 Hz being typical for use in the present invention. Signal 40, therefore, also represents the amplitude and frequency of the magnetic field which intersects flowtube 10.

In an ideal flowmeter, Faraday's Law of Induction predicts that the electrodes 12 will sense a voltage amplitude similar to signal 40, which, during periods when the direction of the magnetic field is constant, i.e. $t_2-t_3$, $t_4-t_5$, and $t_6-t_7$, may be approximately represented by Equation 1 below. In Equation 1, $V_{40}$ represents the amplitude during one of the above-identified time intervals of interest, u represents the velocity of fluid flow, B represents the magnetic field intensity, and d represents the internal diameter of the flowtube.

$$V_{40} = uBd \qquad \text{Eq. 1}$$

For a given flowmeter where B and d are constant by design choice, the amplitude of the electrode signal is directly proportional to the process fluid flow rate. However, in a non-ideal flowmeter, induction spikes cause dielectric relaxation offsets and the shape of the electrode signal deviates from that of signal 40, as explained hereinafter.

Referring again to FIGS. 1 and 2A–B, when a magnetic field intersects a process fluid flowing at right angles to the magnetic field, an electric field is induced in the process fluid extending between the electrodes 12 in flowtube 10. This electric field causes charges to move in electrodes 12 and lead 36. Such movement of the charges is detected by processing circuit 28 and is both desirable and necessary for proper operation of the flow meter. However, the physical arrangement of electrodes 12 and leads 36, in conjunction with the conductive process fluid 11, form a pick-up loop 15 that is also sensitive to the changing magnetic field.

Figure 2B:
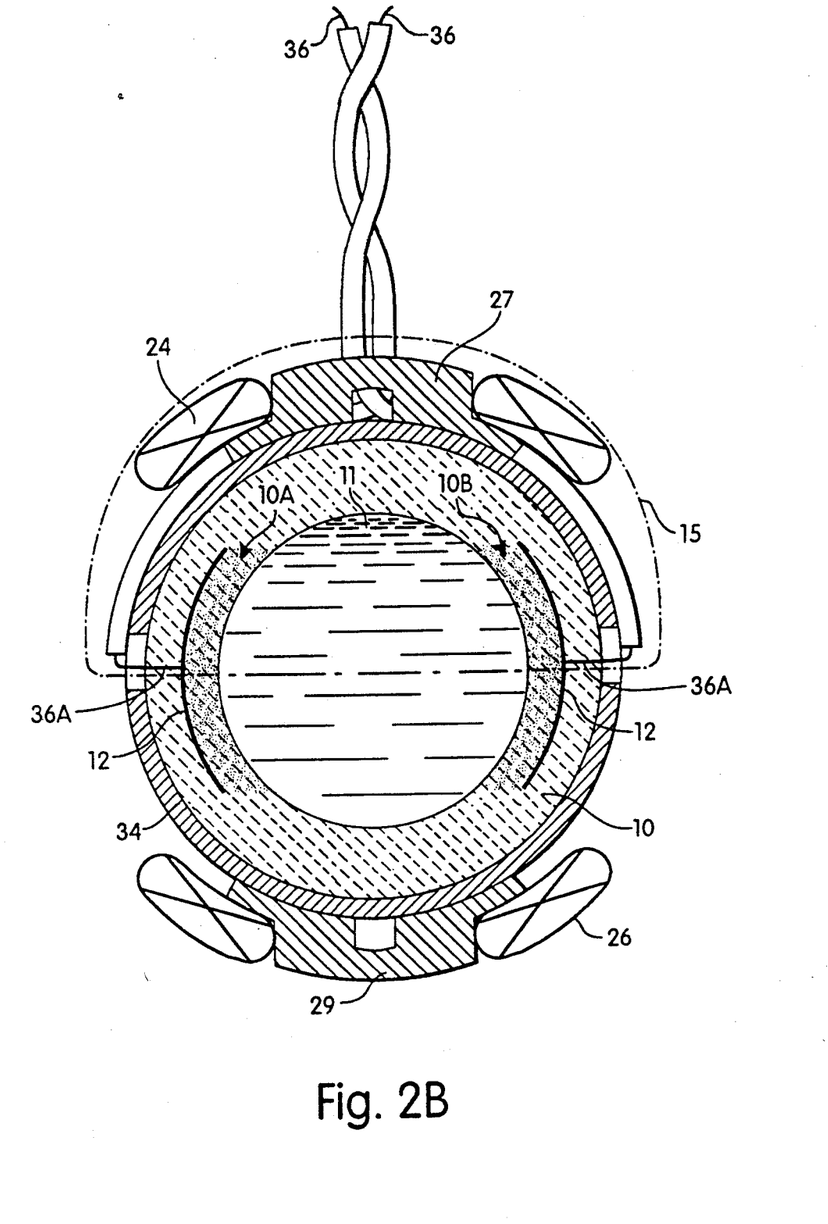
FIG. 2B is a partial, cross-sectional view of an electromagnetic flowmeter according to the present invention.

Referring to FIG. 2B, pick-up loop 15, indicated by the broken-line, has the shape of a hemicircle, the diameter of which is approximately the same as the outside diameter of flowtube 10. The pick-up loop is essentially a collection of conductors and insulators located inside, outside and within the walls of flowtube 10. In particular, pick-up loop 15 comprises the conductive process fluid 11, electrodes 12, the polarizable dielectric zones 10A–B of flow tube 10, lead out sections 36A of leads 36, and the untwisted length of leads 36.

Designers, by choice, try to minimize the magnetic flux intersecting pick-up loop 15, but some magnetic flux lines penetrate pick-up loop 15, and, when the magnetic field changes direction, cause a voltage to be induced across the electrodes 12. This induced voltage does two things. First, it is manifest as a series of induction spikes present in the signal output of flowmeter 30, even when the process fluid flow rate is zero. Second, it polarizes the dielectric in the zone between the electrodes and the process Signal 42 of FIG. 3 illustrates the pulse-shaped waveform of an induction spike pattern present at the output of flowmeter 30 when the process fluid flow rate is zero and when the dielectric material between the process fluid and the electrodes exhibits no polarization relaxation effects. In signal 42, the induction spikes, occurring between $t_1-t_2$, $t_3-t_4$, $t_5-t_6$ and $t_7-t_8$, are synchronous with changes in the coil current, signal 40. In addition, at time $t_1$ when signal 40 begins a positive-going transition, a positive induction spikes occurs and continues until time $t_2$ when the transition of signal 40 is completed, at which time signal 42 returns to zero. At time $t_3$, when signal 40 begins a negative-going transition, a negative induction spike occurs and continues until time $t_4$ when the transition in signal 40 is completed, at which time signal 42 again returns to zero. As can be seen from a comparison of signal 40 with signal 42, signal 42 is the time derivative of signal 40. The voltage amplitude of the induction spikes during the times in which the direction of the magnetic field is changing, i.e. $t_1-t_2$, $t_3-t_4$, $t_5-t_6$, $t_7-t_8$, can be expressed by Equation 2 below where $\phi$ represents the total flux passing through pick up loop 15 and t represents time. A reduction in the slope of signal 40 results in a decrease in the amplitude of signal 42.

$$V_{42} = d\phi/dt \qquad \text{Eq. 2}$$

We have discovered that when an induction spike occurs, i.e., at $t_1$, $t_3$, $t_5$ and $t_7$ the spike polarizes the dielectric material (10A, 10B) between electrodes 12 and the process fluid by causing ions to migrate in response to the electric field in the dielectric material caused by the induction spike. When the induction spike of signal 42 returns to zero volts, i.e. at $t_2$, $t_4$, $t_6$ and $t_8$ the mobile ions reverse their movement through the dielectric material creating a relaxation current in the dielectric material and a voltage between electrodes 12. The voltage on the electrodes caused by the dielectric relaxation current becomes the zero offset component of the output flow signal of the flowmeter, as explained hereinafter.

Signal 44, illustrated in FIG. 3, is the voltage on electrodes 12 in response to excitation by an induction spike signal 42 for a flowtube 10 constructed of materials having sufficiently large numbers of mobile ions and consequent dielectric loss. A zero offset is caused by the polarization relaxation current within the dielectric material of flowtube 10. This relaxation current results from more than one physical mechanism in the dielectric material. A simple model of the relaxation current consists of several exponentially decaying processes as described in Equation 3 below.

$$f(t) = C_1 e^{-k_1 t} + C_2 e^{-k_2 t} + \ldots + C_n e^{-k_n t} \qquad \text{Eq. 3}$$

In Equation 3, f(t) can represent either the current in a polarized region of the dielectric material, or the voltage output of processing circuit 28, since processing circuit 28 converts the current at the electrodes of flowtube 10 into a voltage. Signal 44 shows f(t) exaggerated for illustration, during the time intervals $t_2$-$t_3$, $t_4$-$t_5$, and $t_6$-$t_7$ The constants $C_1$, $C_2$, ..., $C_n$ are the relative amplitudes of the individual physical processes and the constants $k_1$, $k_2$, ..., $k_n$ are the corresponding time constants. The variable n is the number of contributing physical mechanisms occurring within the dielectric material.

Signal 46 of FIG. 3 illustrates the output of flowmeter 30 which is a summation of the induction spike signal 42, and an non zero flow rate signal, similar in shape and frequency to the coil current, signal 40. The voltage amplitude of signal 46 during an interval of interest, i.e. $t_2$-$t_3$, may be expressed by Equation 4 below, in which all variables are defined the same as in Equations 1 and 2.

$$V_{46} = uBd + d\phi/dt \qquad \text{Eq. 4}$$

The value of $d\phi/dt$ is zero during time $t_2$-$t_3$ signal, and, for a dielectric material without any loss characteristics, the induction spike occurring during time $t_{1-2}$ has no effect on $V_{46}$ during time $t_2$-$t_3$. The quality uBD alone contributes to $V_{46}$ during time $t_2$-$t_3$. Unfortunately, the zero offset resulting from the dielectric loss property of the material from which the flowtube 10 is formed, and which is present in signal 44, is likewise present in the non-ideal output flow signal 48, as illustrated in FIG. 3. As in signal 44, the zero offset caused by the dielectric relaxation current is exaggerated for the purpose of illustration. As can be seen from FIG. 3, output flow signal 48 is the summation of signal 44 and signal 40. The voltage amplitude of signal 48 during an interval of interest, i.e. $t_2$-$t_3$, may be expressed by Equation 5 below, in which all variables are defined the same as in Equations 1 and 3.

$$V_{48} = uBd + f(t) \qquad \text{Eq. 5}$$

The times of interest, in which the output flow signal 48 is sampled, occur between times $t_2$-$t_3$, $t_4$-$t_5$, and $t_6$-$t_7$, and are indicated in FIG. 3 by sampling points S. The values of signal 40 at a plurality of sampling points within a given time interval are averaged together. The resulting average value is then added to the absolute value of the average value from the next time interval and the sum of the average values divided by two. The resulting quotient represents the volumetric flow rate of the process fluid through the flowtube. It can be appreciated therefore that the signal caused by the dielectric relaxation current, and which is present during the respective times of interest, acts as a zero offset in output flow signal 48.

Briefly summarizing the signals of FIG. 3, signal 40 is proportional to the drive coil current and hence the magnetic field. Signal 42 illustrates induction spikes at zero flow rate for a flowtube having no dielectric loss characteristics. Signal 44 is similar to signal 42 except that the dielectric material has dielectric loss characteristics. Signal 46 illustrates induction spikes at a non-zero flow rate in a flowtube having no dielectric loss characteristics. Finally, signal 48 is similar to signal 46 except that the dielectric material from which the flowtube is made has dielectric loss characteristics.

By forming a flowtube from a dielectric material which has less of a tendency to polarize in the presence of an induction spike, the dielectric relaxation current will be reduced, as will the amplitude of the corresponding compound exponential decays. A decrease in amplitude of the zero offset will result in an output flow signal which more accurately represents the volumetric flow rate of the process fluid through the flowtube and enables more frequent flow rate measurements. The increased frequency of measurements facilitates more accurate and timely process control. Accordingly, it will be appreciated from the above explanation that the dielectric material and the dielectric relaxation characteristics thereof directly effect the zero offset in the output flow signal as well as the frequency with which the flow signal may be measured.

It is known that the dielectric loss of a material increases with the number of mobile ionic species present within the material. A dielectric material having fewer mobile ionic species will have less of a dielectric loss, and, as we have discovered, introduce less of zero offset into the output signal of the flowmeter. Further, the mobility of ionic species in many dielectric materials, such as ceramics, is exponentially related to the temperature of the material itself. As the temperature of the material increases, the mobility of the ions within the material increases exponentially and, accordingly, the dielectric loss of the material increases. For flowtubes used with processes in the temperature range of between $-40°$ C. to $200°$ C., the ion mobility and resulting dielectric loss can become so great as to render useless the output flow signal from the flowmeter.

The number of mobile ions present in a dielectric material, such as a ceramic, increases with the concentration of impurities present in the material. These impurities can contain both mobile and immobile ions. The mobile ions primarily come from Group Ia of the Periodic Table of Elements. Of these, sodium and potassium are the most common mobile impurities in ceramic materials. As the purity of the dielectric material increases, the number of mobile ions decreases, as does the dielectric loss of the material and the resulting zero offset present in the output flow signal from the flowmeter. Accordingly, by using a dielectric material which has sufficiently low concentration of mobile ions, the dielectric loss of the material and the zero offset in the output signal of the flowmeter may be reduced, resulting in an output flow signal which more accurately reflects the flow rate of the process fluid through the flowtube.

A number of improved purity dielectric materials are commercially available for use as flowtube 10 which have reduced ion mobility and dielectric loss therein. Man-made materials, such as synthetic sapphire, a single crystal aluminum oxide, possess the desired purity, however, they are expensive. A ceramic material with dielectric properties suitable for use as flowtube 10 in the present invention is alumina commercially available under the tradename Vistal from Coors Ceramic of Golden, Colo. Another ceramic material suitable for use in the present invention as flowtube 10 is a spinel (magnesium aluminum oxide), referred to a type S-71 and commercially available from Trans-Tech, Corp. of Adamstown, Md. Also, alumina which is greater than 99.5% pure is suitable for use with the present invention.

Generally, any dielectric material, preferably ceramic, which has a combined total of less than 100 parts per million (PPM) by weight of impurities from Groups Ia of the Periodic Table is suitable for use for flowtube 10 of the present invention. A preferred dielectric material will have a combined total of equal to or less than 100 PPM by weight of sodium oxide ($Na_2O$) and potassium oxide ($K_2O$). It will be obvious to those reasonably skilled in the art that other high purity materials are available which are suitable for use with the present invention.

In addition to the above-described specification for mobile ion concentration, there are other measurable parameters to quantify the preferred dielectric characteristics of a material. In particular, a suitable dielectric material will have a D.C. conductivity which does not exceed $10^{-13}$/ohm.cm at 200° C. The second, a suitable dielectric material will have a dielectric loss tangent (tan $\delta$) which does not exceed 0.002 at 10 Hz at 200° C. Third, 50 milliseconds after a constant polarizing voltage is applied to a suitable dielectric material at 200° C., the dielectric material will have a relaxation conductivity, $\sigma_r$, as expressed in Equation 6 below.

$$\sigma_r < 10^{-12} \frac{\text{Amperes}}{\frac{\text{Volts}}{\text{cm}} \cdot \text{cm}^2} \qquad \text{Eq. 6}$$

The units of $\sigma_r$ in Eq. 6 are amperes of current, volts per centimeter of applied electric field, and square centimeters of dielectric area and are expressed as shown for the sake of clarity. It can be appreciated that Equation 6 may be mathematically simplified to $\sigma_r < 10^{-12}$ per ohm.cm. The value of $\sigma_r$ in Equation 6 describes the relaxation conductivity of the dielectric material and is particularly useful since it is related to the preferred method used to make flow measurements as described herein.

The above-described specifications for mobile ion concentration, D.C. conductivity, dielectric loss tangent, and relaxation conductivity are roughly equivalent for the purposes of this application, however among these specifications, the relaxation conductivity is preferred.

A flowtube 10 made of a dielectric material having the properties in accordance with the present invention will substantially reduce the zero offset component in the output flow signal due to reduced ion migration in the flowtube material and therefore provide greater accuracy in detecting the flow rate of a process fluid through the flowtube.

Figure 4A:
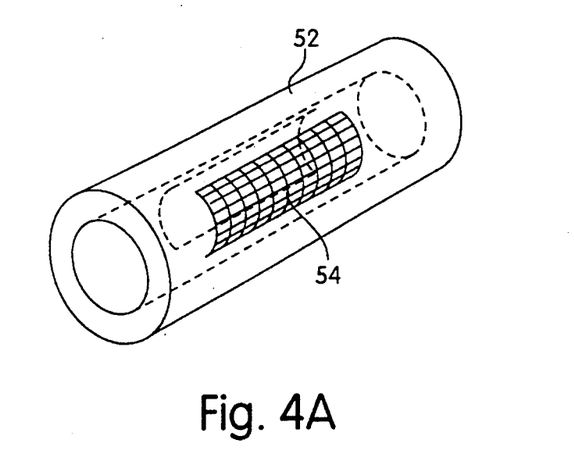
FIGS. 4A-B are perspective and axial views, respectively, of a partially completed flowtube in accordance with the method of the present invention.
Figure 4B:
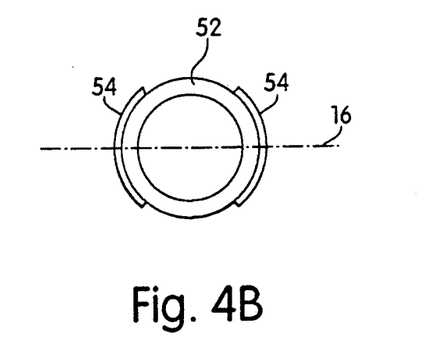

According to a second, equally important aspect of the present invention, a method for manufacturing a monolithic flowtube for use with an electromagnetic flowmeter is presented. Referring to FIGS. 4A-B, a method for manufacturing a monolithic flowtube 50 for use with an electromagnetic flowmeter includes the first step of forming an inner tubular conduit 52. Conduit 52 may be formed from alumina which is at least 99.5% pure or from one of the other previously described dielectric material suitable for use with the present invention. The dielectric material is placed, in a powdered form, in a mold and pressure applied to the mold to compress the powder into a substantially elongate cylindrical shape which is green or unfired. Such a mold may comprise a mandrel surrounded by an inflatable bladder for applying pressure to powdered ceramic material placed between the mandrel and the bladder.

Next, a pair of rectangular, arcuate electrodes 54 are formed on the exterior surface of conduit 52, only one of which is shown in FIG. 4A. Electrodes 54 are diametrically opposed to one another about transverse axis 16, as shown in FIG. 4B. Each electrode extends over an arc of approximately 30° to 150° about the perimeter of conduit 52. Each electrode may have a thickness of between approximately 0.0005 to 0.002 inches and nominally equal to 0.001 inches. Electrodes 54 are formed by mixing a conductive material, preferably a refractory metal, with a binding agent into a viscous, electrically conductive paste. The conductive paste is then mechanically deposited in a predetermined pattern onto the exterior surface of tubular conduit 52 at selected areas, as explained hereinafter.

The conductive paste may comprise a metal powder, having particles, typically a few tens of microns in extent. The conductive paste may further comprise, powdered glass frit, and organic binders such as cellulose and pine oil. The percent of metal powder by volume of unfired conductive paste may be greater than 80%. The binders give the conductive paste rheological properties suitable for subsequent screen printing and firing, as explained hereinafter. During firing, the organic binders burn off, ideally leaving no residue. In the present method, in which the conductive paste layer is buried under an outer layer of ceramic material, as explained hereinafter, the organic binders should be chosen so that any outgassing of the binder is complete before conduit 52 and the outer layer of ceramic are sintered together. If the organic binders within the conductive paste continue to outgas during sintering, cracks or splits in the exterior surface of the resulting sintered flowtube may result.

The metal used in the conductive paste which forms electrodes 54 must endure the firing process that sinters conduit 52 and the outer ceramic layer together. Such firing processes typically reach a maximum temperature of 1,650° C. Platinum, a noble metal, can endure such temperatures and may be further fired in any atmosphere, including air. Unfortunately, platinum is expensive since approximately two grams of platinum are required to form a pair of electrodes on a conduit having only a two inch diameter. Refractory metals such as tungsten, molybdenum and molymanganese alloy are cost effective alternatives to platinum, however, special firing conditions are required. Refractory metals must be fired in a reducing atmosphere, as explained hereinafter, to prevent the metal from forming a non-conductive oxide which cannot function as an electrode. In a preferred embodiment, the conductive paste is formed from molymanganese alloy since it possesses superior ceramic-to-metal bonding characteristics.

The conductive paste is mechanically deposited onto the exterior surface of conduit 52 in a predetermined pattern to form a pair of substantially arcuate electrodes 54. In one embodiment, the conductive paste may be screen printed onto conduit 52 using a conventional, two-dimensional screen printer which has been modified to print on cylinders, or a commercially available screen printer specifically designed for screen printing non planar parts. In conventional screen printing, a paste is deposited in the path of a squeegee and forced through a screen pattern and onto the workpiece by the movement of the squeegee. In the present invention, conduit 52 is slipped over a mounting cylinder which is free to rotate and has an axis normal to the direction of squeegee motion. In operation, the motion of the squeegee forces paste through a screen pattern and onto the surface of conduit 52 which is in intimate contact with the screen. The squeegee is mechanically coupled to the mounting cylinder, so conduit 52 rotates as the paste is printed thereon. In this manner, both patterns of conductive paste which form electrodes 54 may be deposited on conduit 52 with one continuous motion of the squeegee across the screen pattern. The conductive paste is deposited in an electrode pattern with tolerances associated with normal screen printing, i.e. a few thousandths of an inch.

The conductive paste may further be deposited onto the exterior of conduit 52 with a paint wheel-type device or, if in a less viscous state, sprayed onto the exterior of conduit 52.

The conductive paste which forms electrodes 54 may be deposited onto conduit 52 in either a grid or solid pattern. A grid pattern facilitates ceramic-to-ceramic bonding between conduit 52 and the outer ceramic layer through the numerous apertures in the grid. Such ceramic to ceramic contact throughout the grid results in a stronger flowtube structure after firing. If the metal used in the conductive paste is platinum, a grid pattern is recommended since platinum, a noble metal, does not bond well to ceramic materials. If the conductive paste is made with molymanganese alloy, which bonds well to ceramics, a solid rectangular electrode pattern may be deposited onto conduit 52 without reducing the strength of the flowtube to unacceptable levels. A grid electrode pattern formed from a conductive paste made with molymanganese alloy will result in a flowtube having good structural integrity, as well as embedded electrodes.

The thickness of the conductive paste layer used to form electrodes 54 effects the integrity of both the electrode and the resulting flowtube. The process of screen printing the conductive paste onto conduit 52 will typically deposit a paste layer of approximately 20-25 microns in thickness. A paste layer having a thickness of greater than 100 microns, as may result from applying the conductive paste with a paint wheel, may be subject to smearing during the subsequent formation of the outer ceramic layer about conduit 52. Also, during the cooling phase of the firing cycle, the difference between linear expansion of the ceramic and metal layers may cause a flowtube having a thick electrode layer to crack. If the conductive paste is sprayed onto conduit 52, a thickness of less than 10 microns may result. Subsequent isopressing of the outermost ceramic layer has the potential of disrupting such a thin layer of conductive paste deposited on a green ceramic, which is held together only by surface tension forces of the organic binders.

It may be appreciated for the reason stated above, that thin film deposition methods such as sputtering, chemical vapor deposition, and electron beam evaporation are not recommended for application of a conductive layer to conduit 52 since the resulting pattern will have a thickness of less than a few microns. Further, such methods are typically performed at near vacuum pressure which would cause the organic binders in the green conduit 52 to outgas and not only interfere with the deposition process but also possibly destroy the unfired conduit.

The surface resistivity for a screen printed and fired layer of conductive paste having a thickness of approximately 20 microns is 0.06 ohms/square for platinum, 0.1 ohms/square for molymanganese alloy, and 1 ohm/square for tungsten. Such surface resistivities are an order of a magnitude larger than that expected for their respective pure metals in the same shape and size, however, these resistivity values are still within an acceptable range. Since high impedance amplifiers in signal processing circuit 28 will typically be coupled to electrodes 54, even a highly resistive electrode layer with a surface resitivity as large as one million ohms/square will be acceptable for use in the present invention.

It will be obvious to those reasonably skilled in the art that any electrically conductive material, including semiconductor materials, may be used to form electrodes 54, as long as the material has a resistivity in the range of $10^{-6}$ ohms.cm. to $2.5 \times 10^3$ ohms.cm.

Figure 5A:
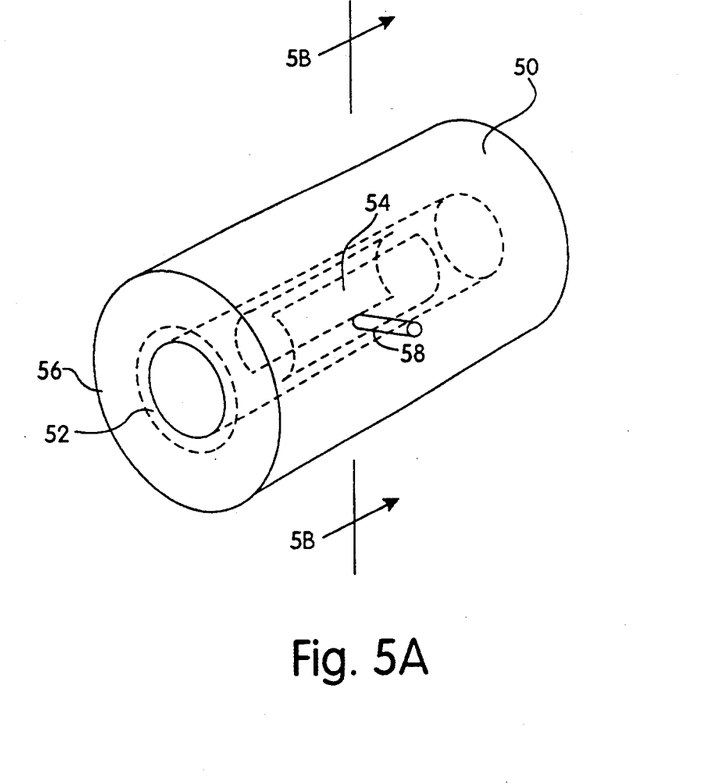
FIG. 5A is a perspective view of a completed flowtube in accordance with the method of the present invention.
Figure 5B:
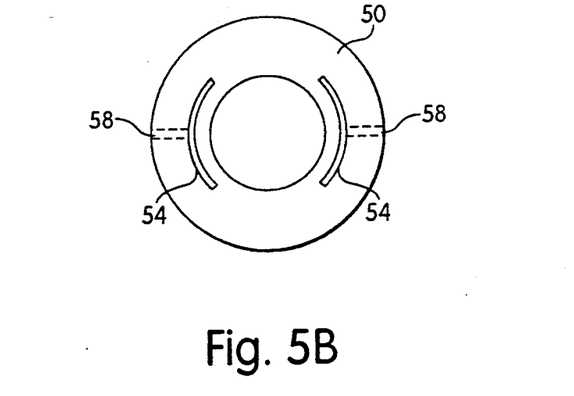
FIG. 5B is a cross-sectional view of the completed flowtube of FIG. 5A as seen along line 5B—5B.

In the next step of the inventive method, an outer layer 56 of ceramic material is formed over conduit 52 and electrodes 54. Outer layer 56 is formed by placing conduit 52 with electrodes 54 formed thereon into a mold and depositing more green ceramic material about the exterior thereof. The outer layer 56 may comprise the same dielectric material from which conduit 52 was formed. Pressure is then applied to the mold, typically by isostatic pressing using the above mentioned bladder, to form the powdered ceramic material into outer layer 56 which is integrally formed with inner conduit 52, as shown in FIGS. 5A-B. The resulting flowtube 50 comprises a single monolithic tube of unfired (green) ceramic material having a pair of conductive electrodes 54 embedded therein.

Next, a pair of lead-outs 58, as shown in FIGS. 5A-B, are coupled to electrodes 54. While flowtube 50 is still in an unfired state, a single aperture may be machined in flowtube 50 in the proximity of each electrode 54 until the electrode is contacted. In one embodiment, lead-outs 58 comprise a mix of ceramic powder and a conductive paste, similar to that used to form electrodes 54, which is used to fill the apertures.

The percent of metal in the mix should guarantee a reliable electrical contact with the electrodes 54 and provide mechanical continuity of the ceramic structure. The percent of metal by volume of fired conductive paste can vary between approximately 30-70%. The spots on the exterior surface of flowtube 50 where leads-outs 58 emerge may be further painted with conductive paste before firing. After firing, the resulting monolithic flowtube has a continuous ceramic structure with a pair of small cylindrical zones, a few millimeters in diameter, having enough conductivity to function as electrical leads for electrodes 54. A lead wire may then be coupled to each lead-out 58 on the surface of flowtube 50. The above-described lead-out embodiment is preferred since the resulting fired flowtube 50 has a strong, continuous ceramic surface which is not penetrated by any non-ceramic structure.

In a second lead-out embodiment, the inside of the apertures are painted down to the electrode with the same conductive paste used to make electrodes 54. Following firing of flowtube 50, as explained hereinafter, the lead-out 58 which in the second embodiment, may comprise a wire, metal pin or braided wire which is inserted into the aperture and secured therein by braising, soldering or with conductive epoxy.

As a final step in the method of the present invention, the unfired flowtube 50 is sintered or fired into a monolithic piece. Flowtube 50 is preferably fired in a reducing atmosphere, such as wet hydrogen, "cracked" ammonia, or forming gas which prevents oxidation of the conductive paste forming electrodes 54 and/or lead-outs 58 during the firing process. Flowtube 50 is typically fired up to 1650° F. The resulting flowtube has no seams into which the process fluid can invade and no voids or air pockets at the juncture of the inner conduit 52 with the outer layer 56.

A flowtube 50 produced in accordance with the method of the present invention is completely monolithic, includes a pair of embedded electrodes, and has dielectric characteristics which will reduce zero offsets induced in the flowtube during normal operational use. It may be appreciated, that a flowtube comprising a ceramic dielectric material in accordance with the first aspect of this invention and manufactured in accordance with the second aspect of this invention has superior structural and electrical characteristics which, when combined with the other known elements of an electromagnetic flowmeter, will provide superior performance and durability in a process control environment.

Accordingly, it will be appreciated that the detailed disclosure has been presented by way of example only and is not intended to be limiting. Various alterations, modifications and improvements will readily occur to those skilled in the art, and may be practiced without departing from the spirit and scope of the invention. The invention is limited only as required by the following claims and equivalents thereto.

What is claimed is:

1. A flowtube comprising:
    a tubular inner flow conduit adapted to pass a fluid therethrough, the inner conduit comprising a dielectric material having a relaxation conductivity, $\sigma_r$, of less than $10^{-12}$ per ohm.cm at 200° C. 50 milliseconds after a polarizing voltage is applied to or removed from the dielectric material;
    electrode means, adjacent the exterior surface of the inner flow conduit and capacitively coupled to the inner flow conduit;
    an outer layer of ceramic material adjacent the exterior surface of the inner conduit and the electrode means; and
    said tubular inner flow conduit, said electrode means, and said outer ceramic layer fired together to form a sintered monolithic flowtube body.

2. The flow tube of claim 1 wherein the flow tube is for use in an electromagnetic flowmeter system which has field generating means for generating an electromagnetic field and processing circuitry, the flow tube further comprising:
    means for coupling the electrodes to the processing circuitry, so that the electrodes and the processing circuitry can provide a signal based at least in part on the field generated by the field generating means.

3. A flowtube comprising:
    a tubular inner conduit adapted to pass a fluid therethrough, the inner conduit comprising a dielectric material having a dielectric loss tangent, tan δ, of less than 0.002 at 10 Hz between −40° C. and 200° C.;
    electrode means, adjacent the exterior surface of the inner flow conduit and capacitively coupled to the inner flow conduit;
    an outer layer of ceramic material pressed adjacent the exterior surface of the inner conduit and the electrode means; and
    said inner flow conduit, said electrode means, and said outer ceramic layer fired together to form a sintered monolithic flowtube body.

4. The flowtube of claims 1 or 3 wherein said dielectric material and said ceramic material comprises aluminum oxide.

5. The flowtube of claims 1 or 3 wherein said dielectric material and said ceramic material comprise magnesium aluminum oxide.

6. The flowtube of claims 1 or 3 wherein the electrode means comprises a pair of arcuate electrodes.

7. The flowtube of claim 6 wherein the electrodes are made of a refractory metal.

8. The flowtube of claim 7 wherein said tubular inner conduit, said refractory metal, and said outer ceramic layer are sintered together in a reducing atmosphere.

9. The flowtube of claims 1 or 3 further comprising means for electrically coupling the electrode means to the exterior of the flowtube.

10. The flow tube of claim 3 wherein the flow tube is for use in an electromagnetic flowmeter system which has field generating means for generating an electromagnetic field and processing circuitry, the flow tube further comprising:
    means for coupling the electrodes to the processing circuitry, so that the electrodes and the processing circuitry can provide a signal based at least in part on the field generated by the field generating means.

11. A flowtube comprising:
    a tubular flow conduit adopted to pass a fluid therethrough, the conduit comprising a dielectric material having a combined total of less than 100 parts per million by weight of impurities selected from the group consisting of sodium and potassium; and
    electrode means, embedded within the tubular conduit and capacitively coupled to said inner flow conduit,
    said tubular conduit and electrode means forming a monolithic flowtube body.

12. The flowtube of claim 15 further comprising:
    means for electrically coupling the electrode means to the exterior surface of the tubular conduit.

13. A flowtube comprising:
    a tubular flow conduit having a dielectric portion through which fluid is adapted to flow, said dielectric portion comprising a material having a combined total of less than 100 parts per million by weight of impurities selected from the group consisting of sodium and potassium, between −40° C. and 200° C.; and
    electrode means capacitively coupled to the interior of the flow conduit through the dielectric portion.

14. The flowtube of claim 13 further comprising:
    means for electrically coupling the electrode means to the exterior surface of the tubular conduit.

15. The flowtube of claims 11 or 13 wherein said material comprise aluminum oxide.

16. The flowtube of claims 11 or 13 wherein the said material comprises alumina that is at least 99.5% pure.

17. The flowtube of claim 13 wherein the electrode means comprises a pair of arcuate electrodes.

18. The flowtube of claims 11 or 13 wherein the electrode means are made of a refractory metal.

19. The flowtube of claims 11 or 13 further in combination with means for generating, within said conduit, a time varying magnetic field transverse to the direction of fluid flow.

20. The combination of claim 19 further in combination with the circuit means for detecting and processing a voltage induced at the electrode means by the intersection of the flowing fluid with the time varying magnetic field.

* * * * *